(12) United States Patent
Quintel et al.

(10) Patent No.: US 8,323,493 B2
(45) Date of Patent: Dec. 4, 2012

(54) FLUID FILTER

(75) Inventors: Mark Anthony Quintel, Kalamazoo, MI (US); Derek Ronald Thelen, Edison, NJ (US); Christopher Scott Rau, Battle Creek, MI (US); Richard Bradley Jacobs, Asbury Park, NJ (US)

(73) Assignee: Eaton Corporation, Cleveland, OH (US)

( * ) Notice: Subject to any disclaimer, the term of this patent is extended or adjusted under 35 U.S.C. 154(b) by 53 days.

(21) Appl. No.: 13/086,699

(22) Filed: Apr. 14, 2011

(65) Prior Publication Data

US 2012/0261359 A1   Oct. 18, 2012

(51) Int. Cl.
*B01D 24/12* (2006.01)

(52) U.S. Cl. ........ 210/266; 210/282; 210/315; 210/316; 210/317; 210/450; 210/452; 210/455; 210/484; 210/500.1

(58) Field of Classification Search .................. 210/241, 210/263, 266, 282, 289, 314–317, 342, 450, 210/452, 455, 484, 500.1, 502.1
See application file for complete search history.

(56) References Cited

U.S. PATENT DOCUMENTS

| | | | | |
|---|---|---|---|---|
| 2,633,990 A | * | 4/1953 | Simpson et al. | 210/282 |
| 3,478,873 A | * | 11/1969 | McLean | 210/671 |
| 3,544,457 A | * | 12/1970 | Tulley et al. | 210/807 |
| 3,631,987 A | * | 1/1972 | Cattano, Sr. | 210/452 |
| 4,419,240 A | * | 12/1983 | Rosaen | 210/444 |
| 4,913,815 A | * | 4/1990 | Shulda | 210/287 |
| 6,180,010 B1 | | 1/2001 | Alper | |
| 7,438,820 B1 | | 10/2008 | Sanchez | |
| 7,459,074 B1 | | 12/2008 | Sanchez | |
| 2006/0163136 A1 | * | 7/2006 | Patil et al. | 210/263 |

FOREIGN PATENT DOCUMENTS

GB                654012           5/1951

OTHER PUBLICATIONS

Thorsten Sembritzki, European Search Report, Jun. 22, 2012, 2 pages, Munich, Germany.

* cited by examiner

*Primary Examiner* — Matthew Savage
(74) *Attorney, Agent, or Firm* — Fay Sharpe LLP (57) ABSTRACT

A filtering system having a housing forming a cavity with a fluid inlet and outlet remote therefrom with a partially porous basket filled with particulate or granular polymer filtering material and the basket surrounded by a bag filter. The housing inlet receives effluent from a strainer. The particulate may be filled in a monofilament polyethylene woven mesh sleeve in the form of a removable cartridge. A pump supplied fluid to be filtered through the strainer and filter housing. The system may be mounted on a wheeled cart for portability; and, in one exemplary version, includes a wastewater reservoir connected to the strainer inlet.

12 Claims, 13 Drawing Sheets

FLUID FILTER

CROSS REFERENCE TO RELATED APPLICATION

This application is related to co-pending application of Mark Anthony Quintel, application Ser. No. 13/086,756, filed Apr. 14, 2011, entitled "FILTER CARTRIDGE FOR USE IN A FLUID FILTER HOUSING AND METHOD OF MAKING SAME," assigned to the assignee of the present application and filed concurrently herewith.

BACKGROUND

The present disclosure relates to filtering of fluids such as wastewater from fire sprinkler systems and fire hydrants prior to discharge of the water into a drain or open body of water in the ecosystem. Currently, environmental regulations require filtration of such wastewater prior to discharge into storm drains.

It has thus been desired to provide a filtration system for in situ filtering of wastewater from the aforesaid systems at the time of required periodic draining in order to eliminate the necessity of collecting the wastewater in a vessel and transporting it to a stationary filtration facility. Heretofore, portable filtration systems for filtering wastewater drained from such systems have encountered problems with plugging from particles and other foreign matter accumulated in the system to be drained. Thus, it has been desired to provide an improved portable filtering system capable of in situ filtering of wastewater from the system to be drained and rendering the filtrate suitable for discharge into a storm drain.

BRIEF DESCRIPTION

The present disclosure describes a filtering system, filter unit and method for filtering wastewater such as drained from a closed system, for example a sprinkler system or fire hydrants and which is capable of being readily transported to the system site and manually positioned for filtering the wastewater in situ. The system employs a strainer for removing large particles and a pump for pumping the strainer effluent through a filtering unit. The filtering unit has a basket filled with particulate polymer material with a downstream portion of the basket perforated to permit outflow of fluid filtration passing through the particulate material. The particulate polymer material may be enclosed in a woven mesh sleeve to facilitate assembly of the filtration unit. The basket is surrounded by a bag filter such that effluent from the polymer particulate material flows outwardly through the basket perforations and subsequently through the bag filter. The effluent of the bag filter is discharged through an outlet in the housing cavity remote from the inlet and to a drain. In one version, the system includes a valve enabling connection of the strainer inlet directly to the system to be drained of wastewater. In another version, a reservoir is provided to accumulate wastewater from the system to be drained; and, the wastewater is pumped from the reservoir through the strainer into the filtration unit. If desired, either of the aforesaid versions of the system may be mounted on a wheeled cart for portability. The version with a reservoir is illustrated and described as mounted on a cart. The cart may be wheeled to the location for draining the system and the system connected to a source of electrical power for operating the pump.

DETAILED DESCRIPTION

Figure 1:
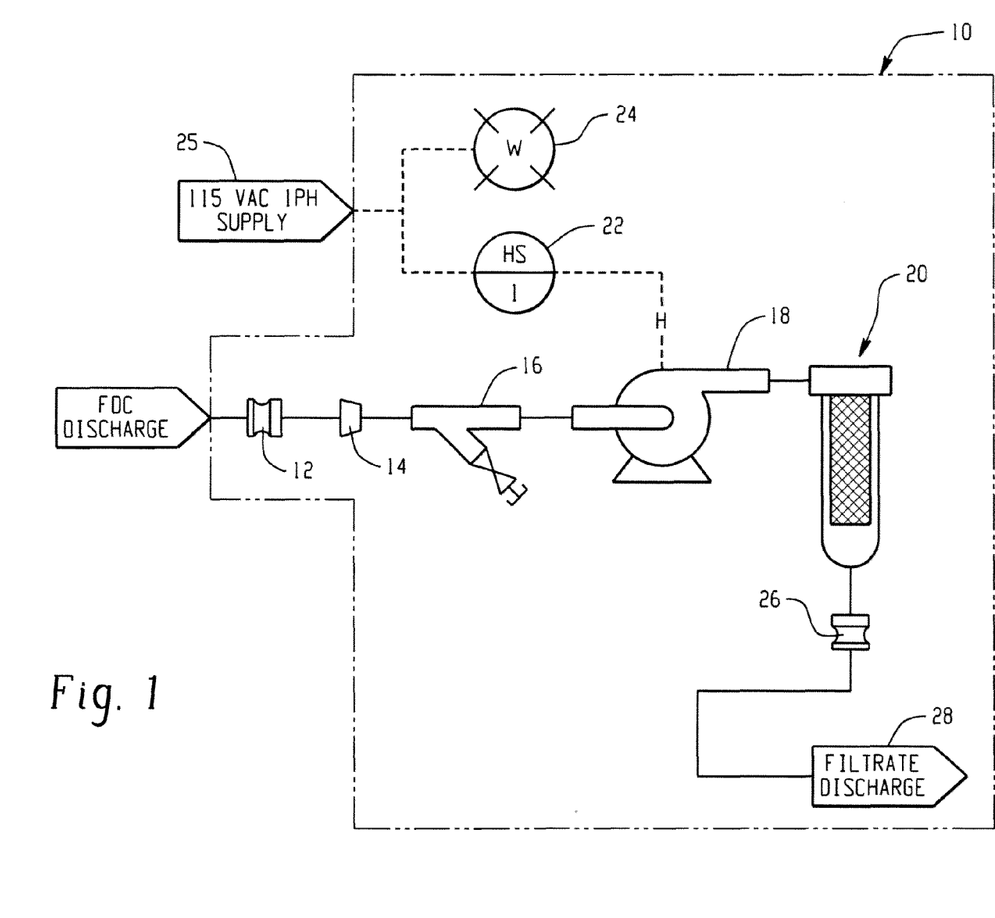
FIG. 1 is a block diagram of the basic version of the system of the present disclosure.

Referring to FIG. 1, one basic version of the system is indicated generally at 10 and includes a quick disconnect fitting 12 adapted for connection to a fire department connection such as that found on a sprinkler system or fire hydrant. The quick disconnect 12 is connected through a reducer 14 to the inlet of a strainer 16 which has the outlet thereof connected to the inlet of a pump 18 which has its outlet connected to the inlet of a filtration unit indicated generally at 20. The pump receives power through an operator's switch 22 connected to an external source of electrical power such as 115 volts ac single phase as indicated in dashed line in FIG. 1 at 25. If desired, a Power-On pilot light 24 may be connected in parallel with the switch 22. The outlet of the filtration unit 20 discharges through a quick disconnect fitting 26 which is adapted for connection to a hose or line to discharge the filtered waste water effluent from the unit 20 as denoted by reference numeral 28 in FIG. 1 and which may be a storm drain.

Figure 2:
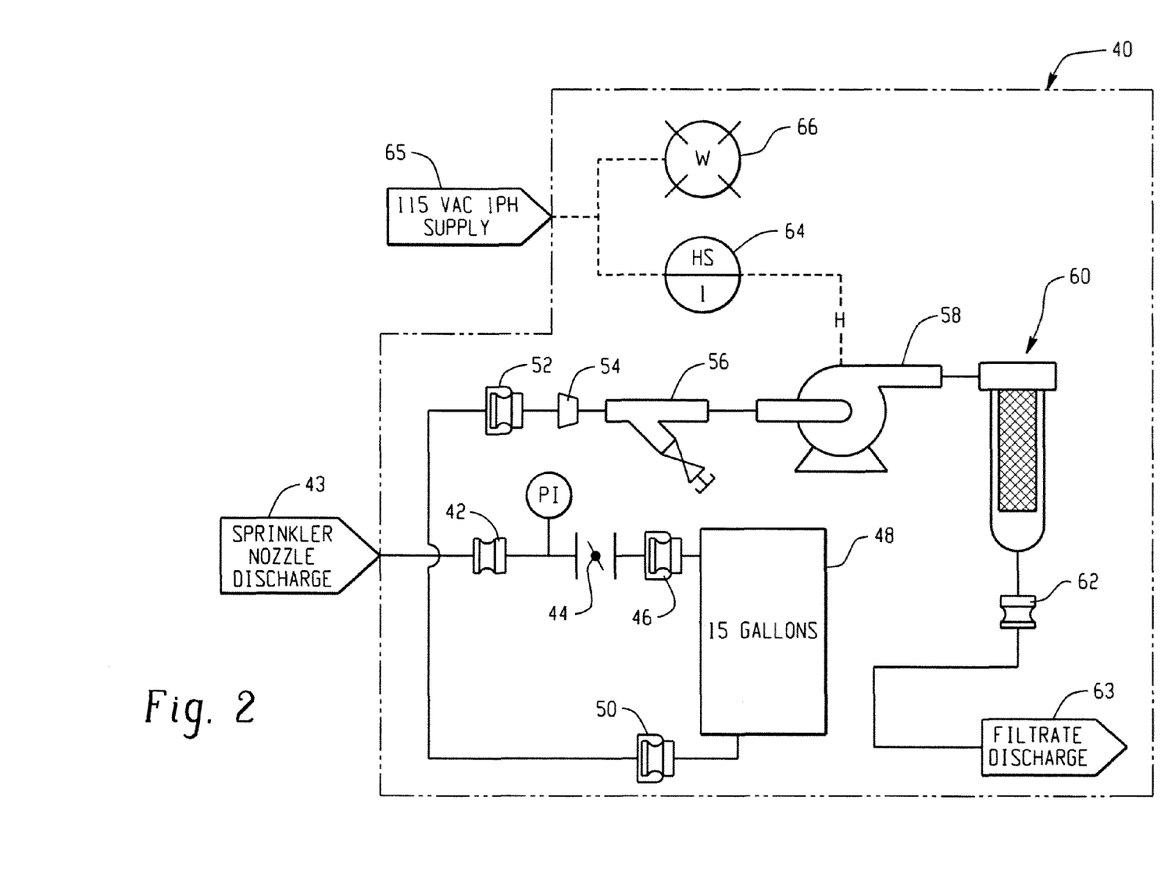
FIG. 2 is a block diagram of another version of the system including a reservoir.

Referring to FIG. 2, another version of the system of the present disclosure is indicated generally at 40 and has a quick disconnect fitting 42 adapted for connection to a sprinkler nozzle discharge 43 and provides wastewater flow through a butterfly valve 44 to a quick disconnect coupling 46 connected to the inlet of a reservoir 48. The reservoir has its outlet connected through a quick disconnect coupling 50 to another quick disconnect coupling 52 which connects through a pipe reducer 54 to the inlet of a strainer 56. The effluent of the strainer is connected to the inlet of a pump 58 which has its outlet connected to the inlet of a filtration unit, indicated generally at 60, which has its outlet connected to a quick disconnect coupling 62 to discharge filtrate at 63 such as to a wastewater drain. The pump receives electrical power from a power supply such as 115 volts ac single phase supply 65 through a manually operated switch 64 which may have in parallel electrically therewith a pilot light 66 for indicating power connection to the system. If desired a pressure indicator denoted "PI" may be connected to the inlet of the butterfly valve.

It will be understood that the system of FIG. 1 is particularly suitable for connection directly to a fire hydrant drain in view of the proximity of hydrants to storm drains; and, the system of FIG. 2 has been found particularly satisfactory for in situ filtration of wastewater from a fire suppression sprinkler system where it may be necessary to drain the system in a building and transport the wastewater to a storm drain for fitting and discharge.

Referring to FIGS. 3-7 the filtration units 20, 60 are illustrated typically in greater detail in which the system has a housing 100 having a generally cylindrical tubular configuration with an open end indicated generally at 102 which is closed by a removable lid 104 secured to a suitable expedient such as swing bolts 106, 108 pivotally mounted respectively to an annular flange 110 disposed about the open end of the housing respectively on bolts 112, 114. The swing bolts may be secured in position by suitable ring nuts 118, 120. The lid may be sealed by an annular seal placed in groove 113.

Figure 3:
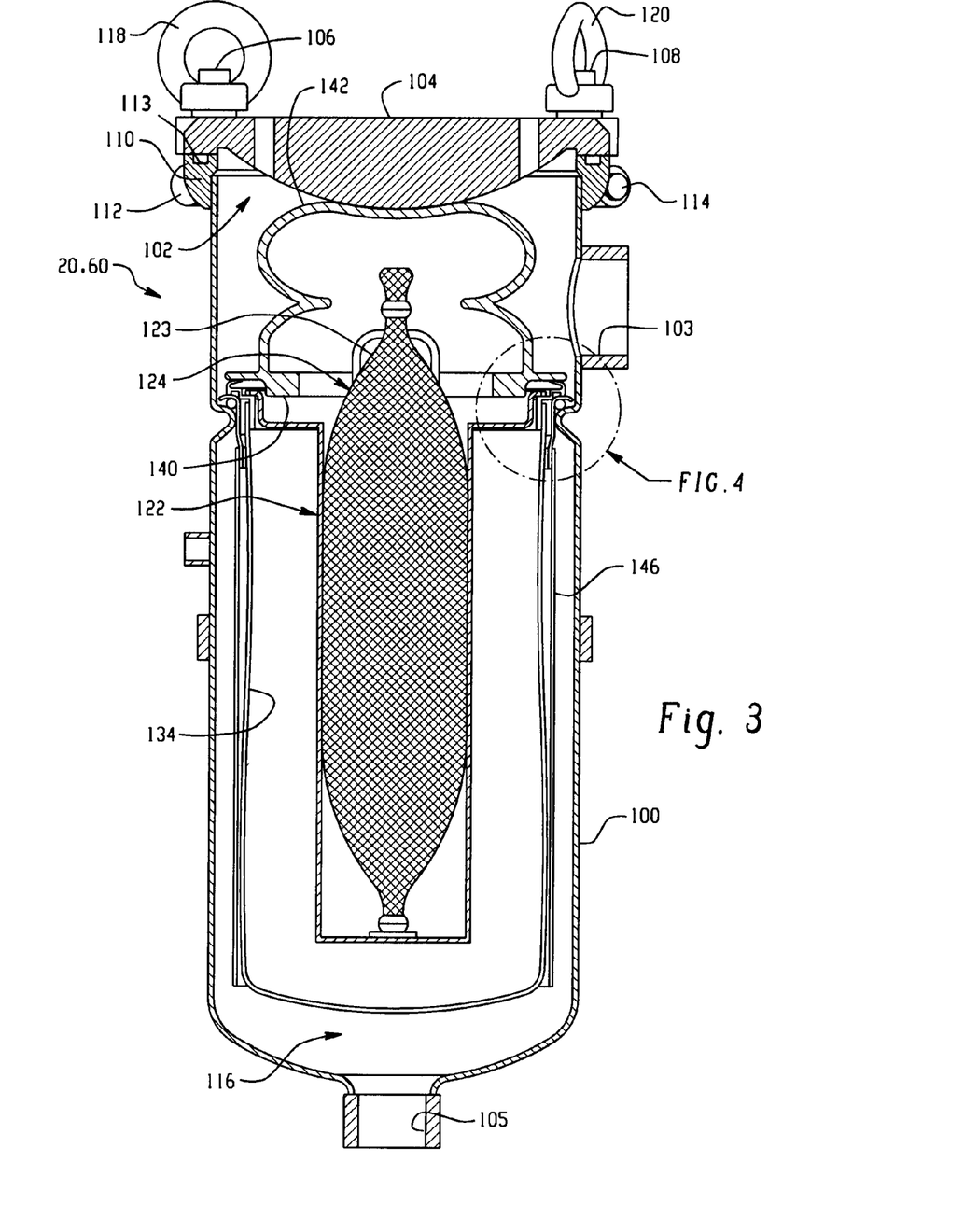
FIG. 3 is a cross-section of the filter unit of the system of FIGS. 1 and 2.

Housing 100 defines a filtering cavity 116 which has disposed therein a basket indicated generally at 122 which has received in the open end thereof a cartridge indicated generally at 124 formed of a sleeve 123 of porous woven mesh filled with particulate polymer material. The sleeve may be formed of 0.25 mm monofilament polyethylene terephthalate woven mesh. In one version, the sleeve has an O.D. in the range of about 38-89 mm and a wall thickness of about 0.635 mm. The monofilament in the exemplary version has a tensile strength D-2265 of about 7.5 pounds. In the present practice, it has been found satisfactory to fill the sleeve of cartridge 124 with particulate polymer material sold under the name Smart Sponge® Plus obtainable from AbTech Industries Inc. 4110 North Scottsdale Road, Suite 235, Scottsdale, Ariz. 85251, Manufacturer's Part No. ACX-10-N-PLUS. The particular polymer material may be treated with an organosilane antimicrobial compound to provide resistance to coliform bacteria. However, if desired, other particulate or granular filtering material may be employed.

Figure 6:
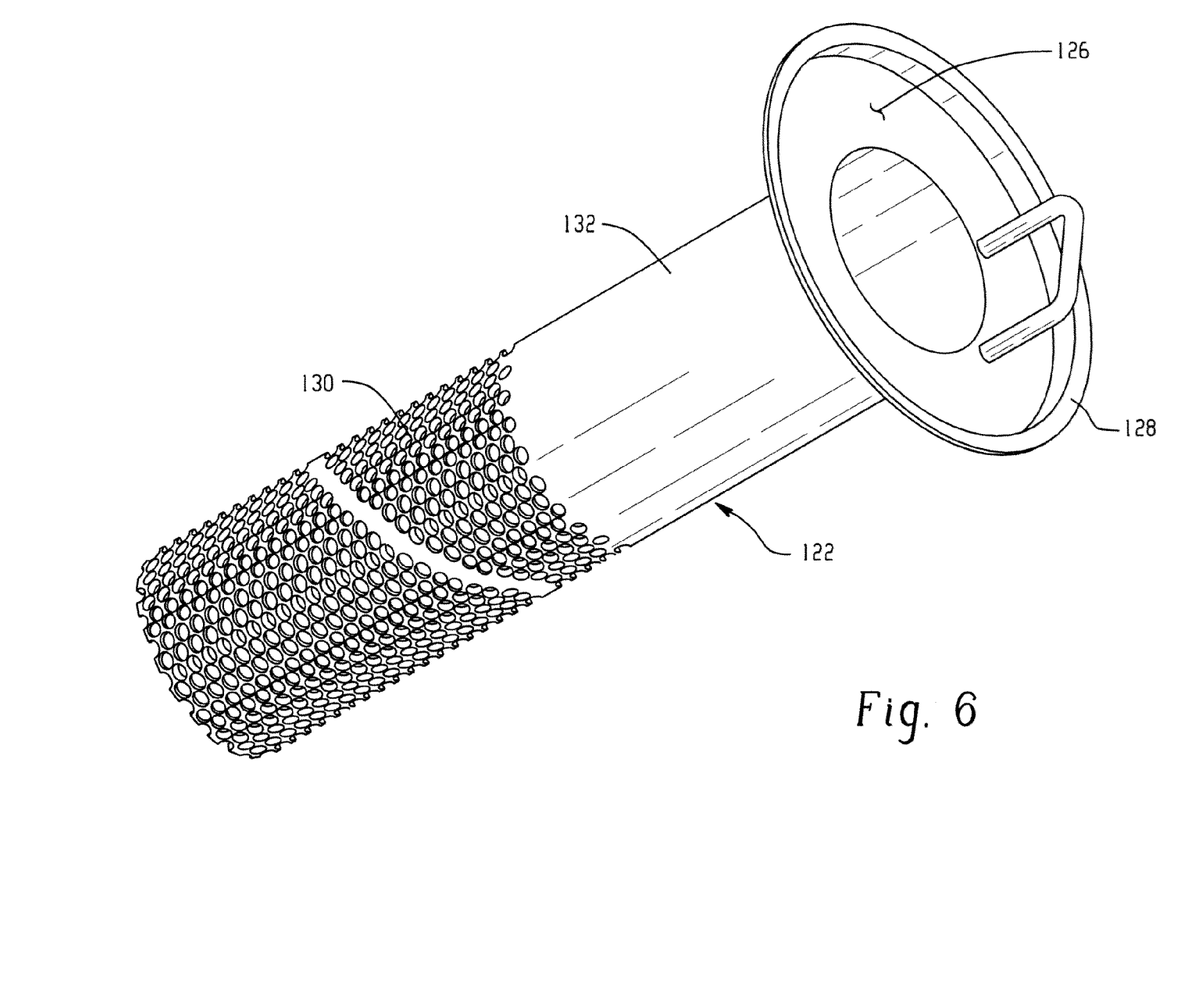
FIG. 6 is an isometric view of the filter basket of the system of the present disclosure.

Alternatively, the sleeve 123 may be omitted and the particulate or granular filtering material dispersed directly in the basket 122. Referring to FIG. 6, the basket 122 has a radially outward extending annular flange 126 formed about the open end thereof which flange has an axially upwardly and outwardly extending lip 128. Referring to FIG. 6, the closed end portion comprising the downstream half of the basket 122 has perforations 130 formed therein. The upper half of basket 122 on portion 132 adjacent flange 126 is imperforate. In the exemplary version illustrated, the basket may be formed of stainless steel or other suitable material.

It will be understood from FIGS. 3 and 6, that the sleeve of cartridge 124, which may be formed of mesh woven from monofilament polyethylene terephthalate material extends longitudinally in the basket into the imperforate portion 132 in FIG. 6 and into the perforated portion 130. If desired, sleeve 123 may be omitted and the particulate or granular material filled directly in the basket 122.

Figure 4:
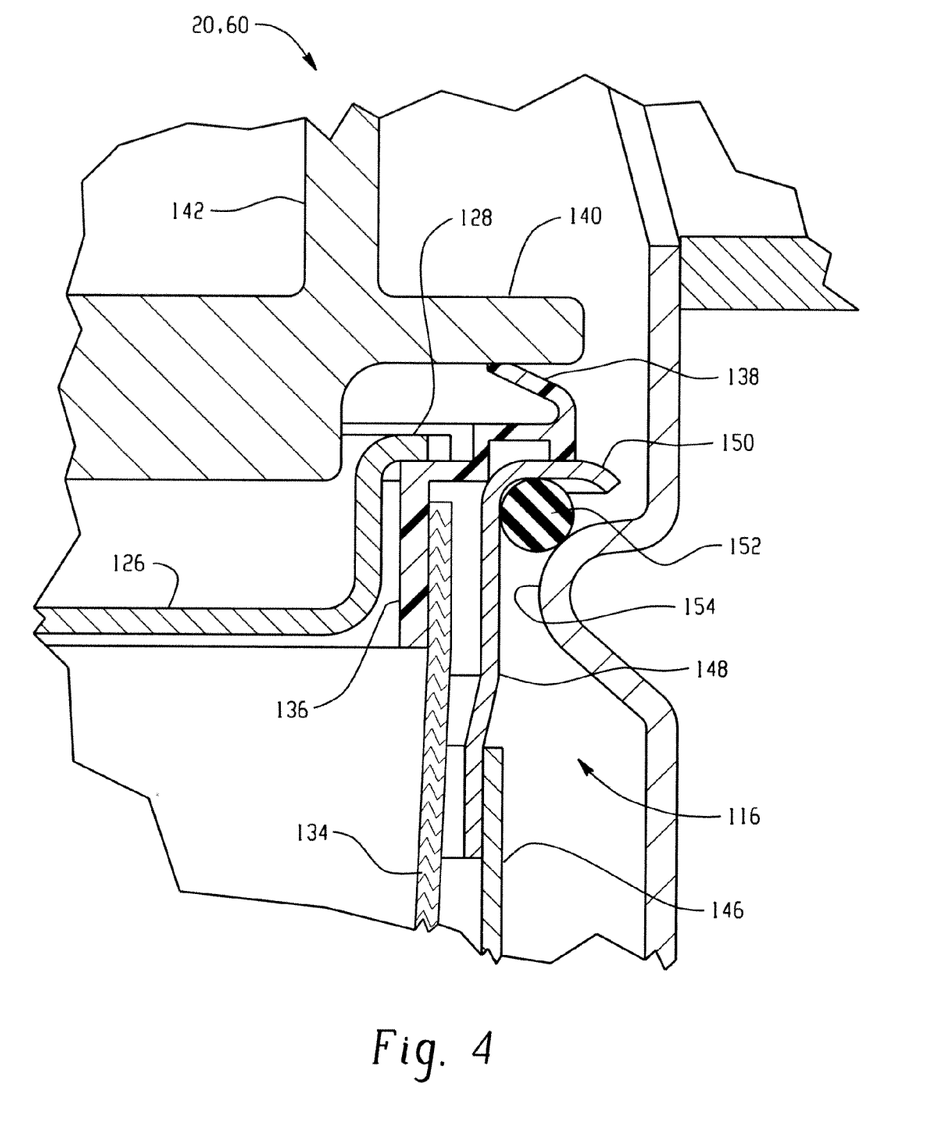
FIG. 4 is an enlarged view of a portion of FIG. 3.
Figure 5:
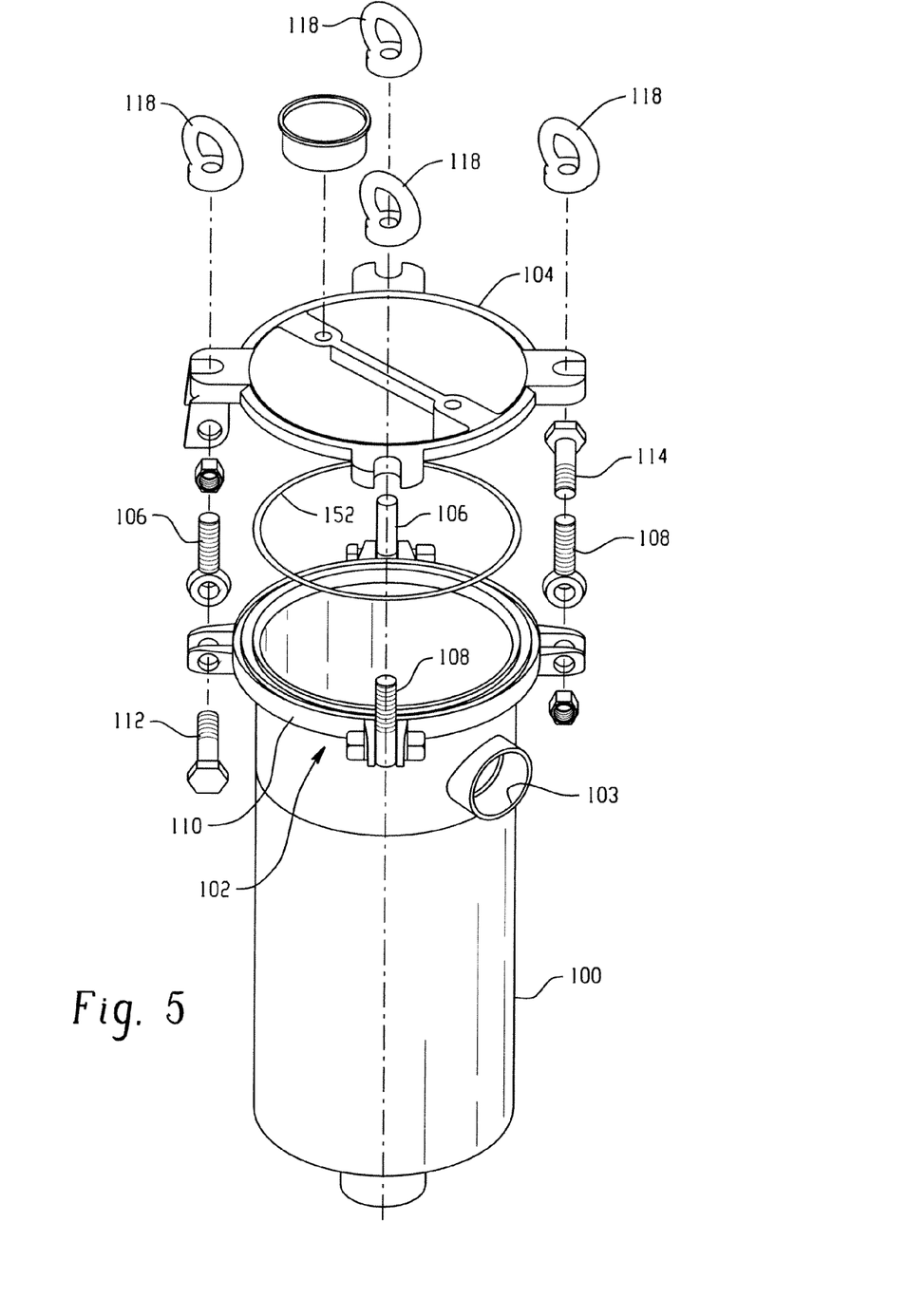
FIG. 5 is an exploded view of the housing of the filter unit of FIG. 3.
Figure 7:
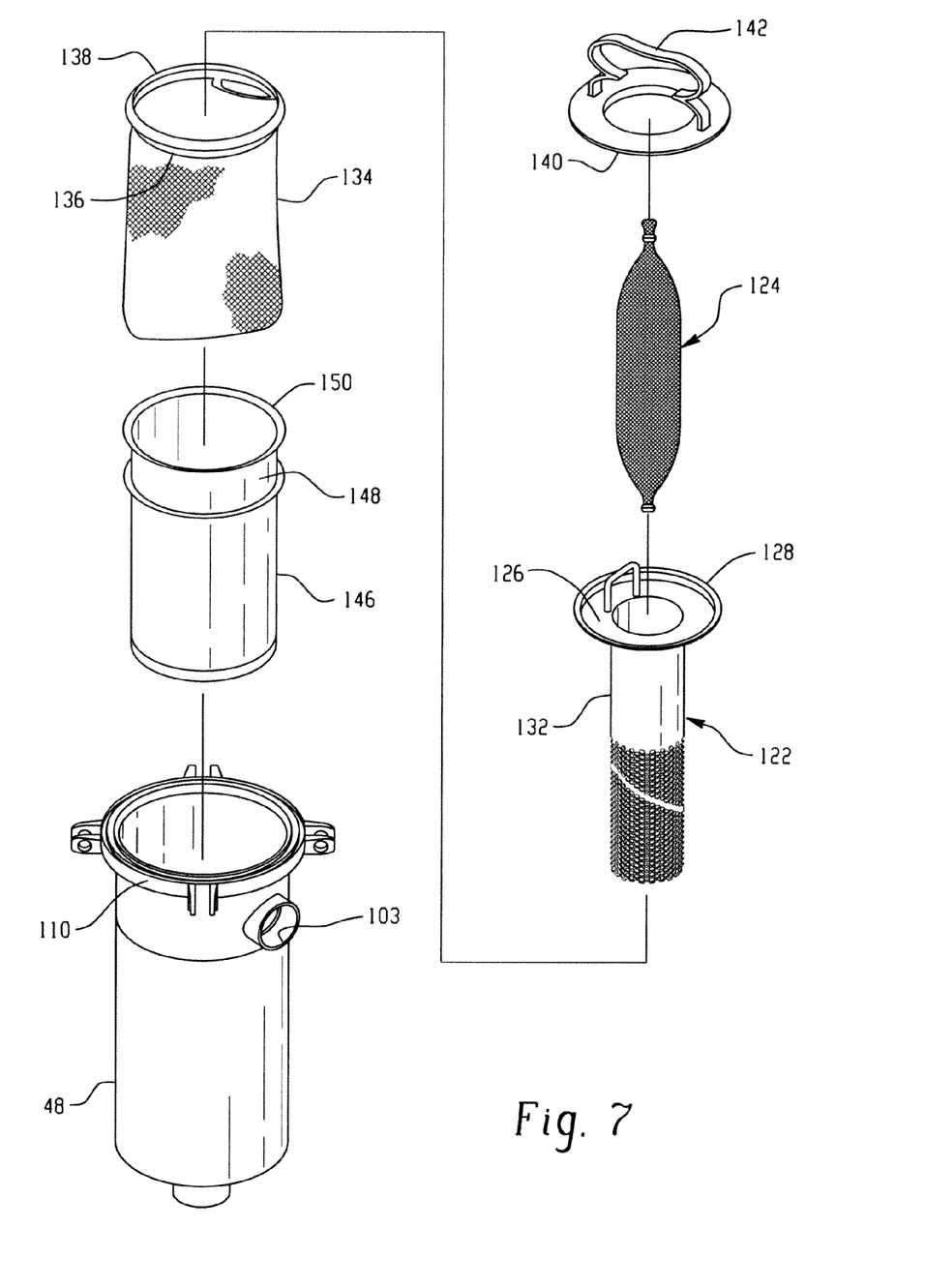
FIG. 7 is an exploded view of the filter unit of FIG. 3.
Figure 8:
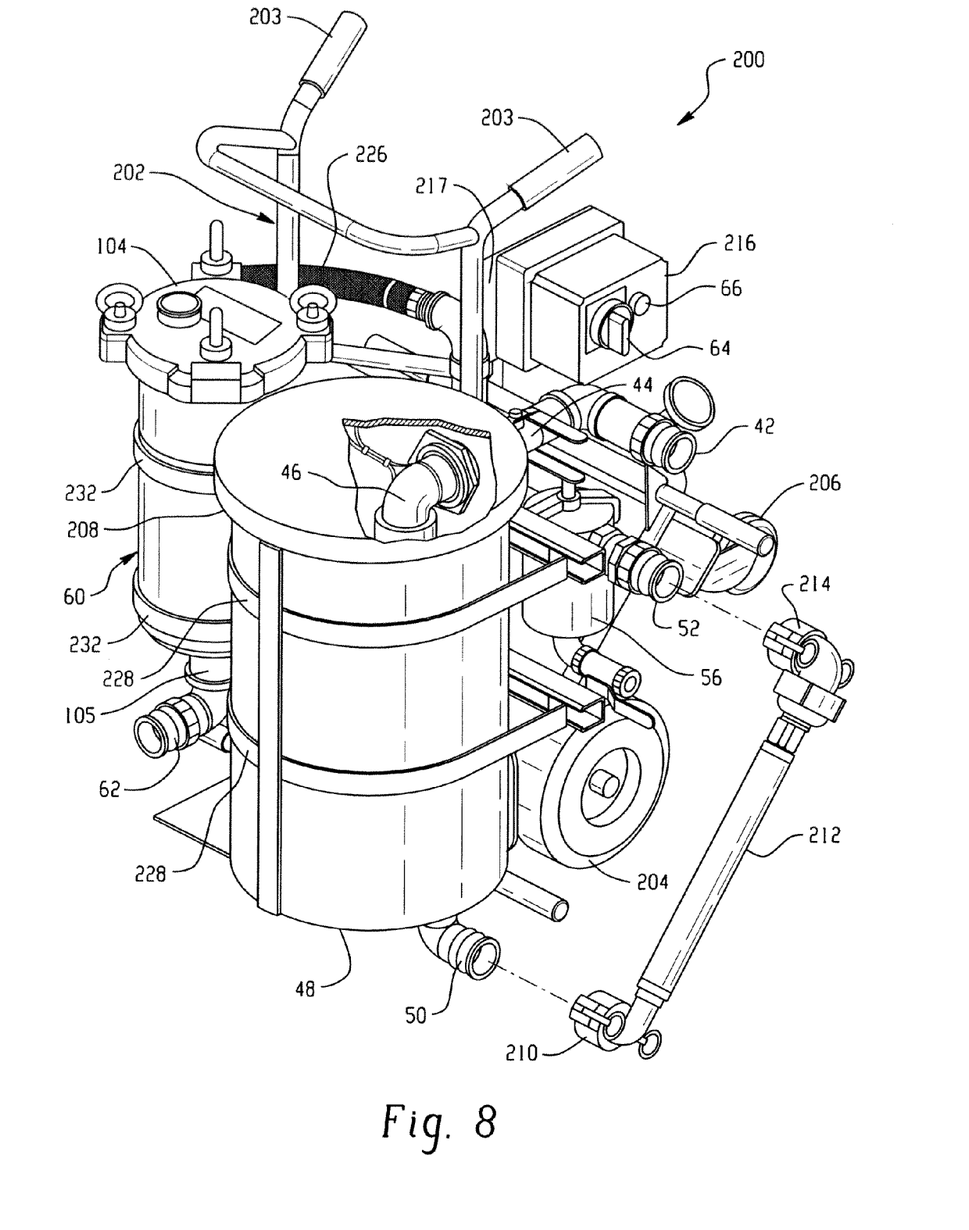
FIG. 8 is an exonometric view of the system of FIG. 2 mounted on a wheeled cart.
Figure 9:
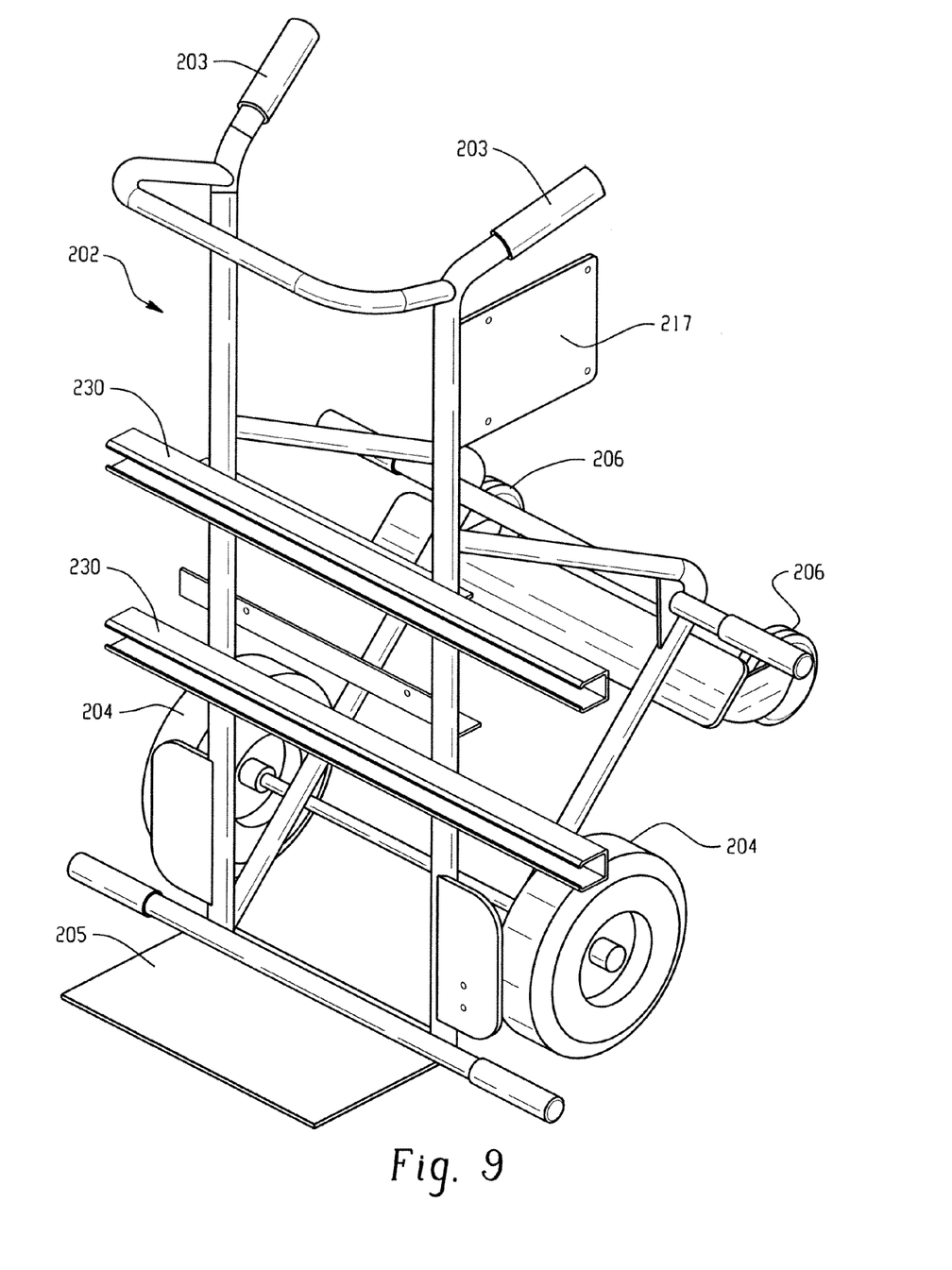
FIG. 9 is an axonometric view of the cart of FIG. 8.
Figure 10:
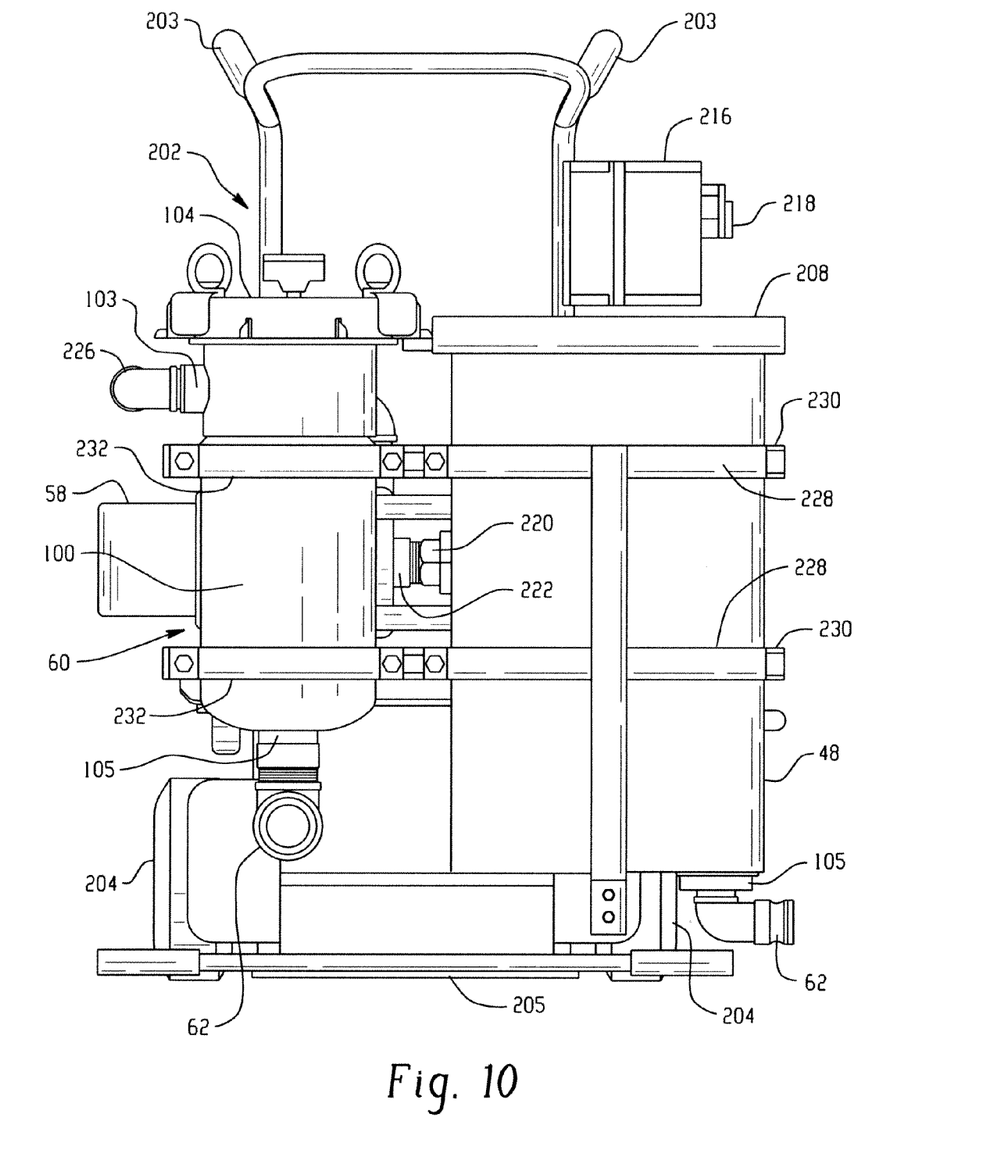
FIG. 10 is a front view of the system of FIG. 8.
Figure 11:
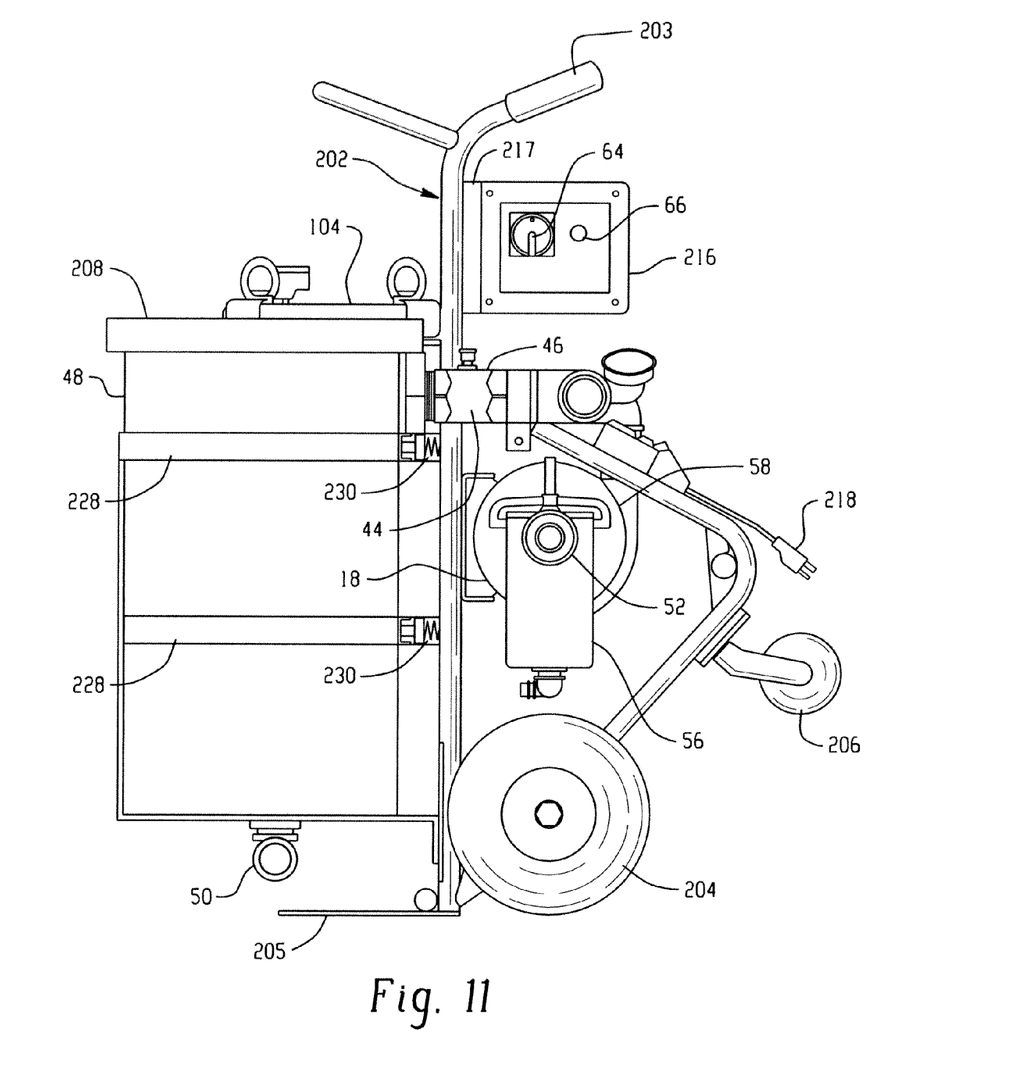
FIG. 11 is a right side view of the system of FIG. 8.
Figure 12:
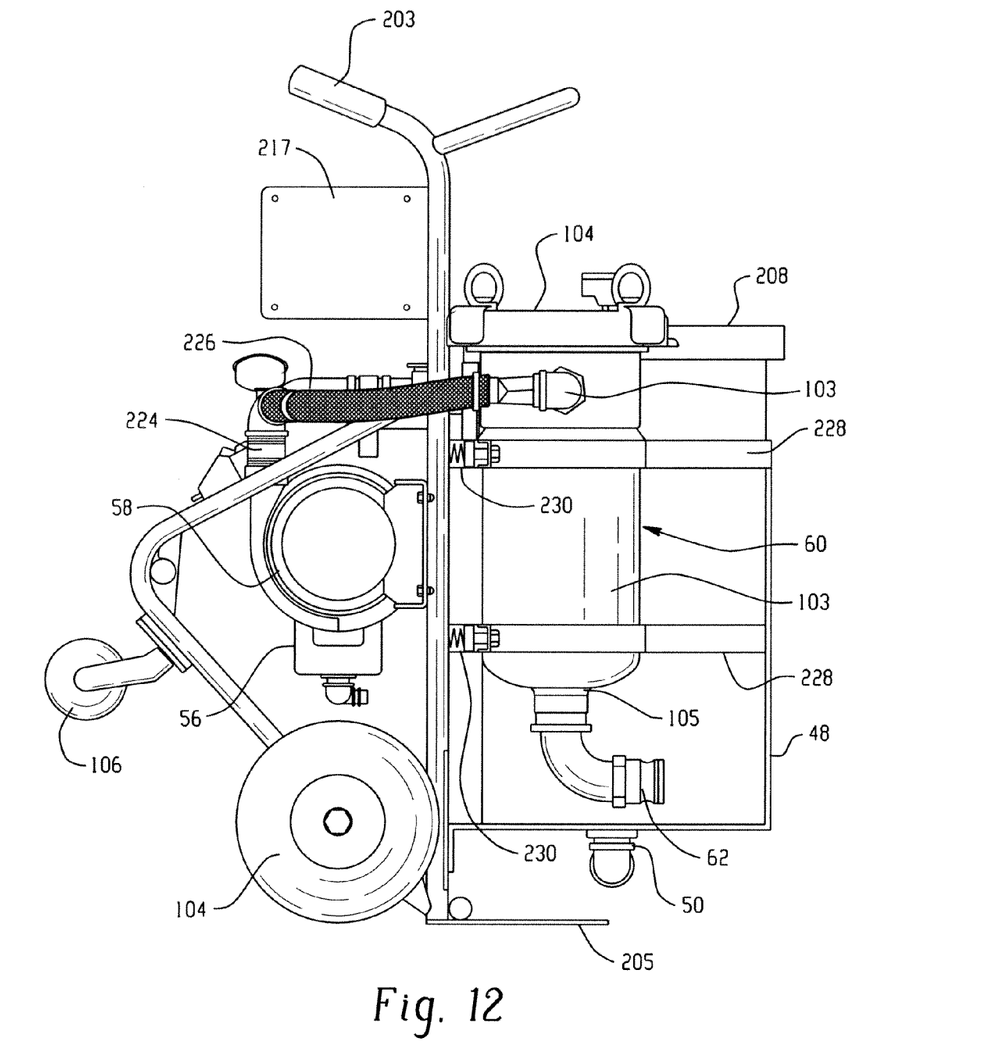
FIG. 12 is a left side view of the system of FIG. 8.
Figure 13:
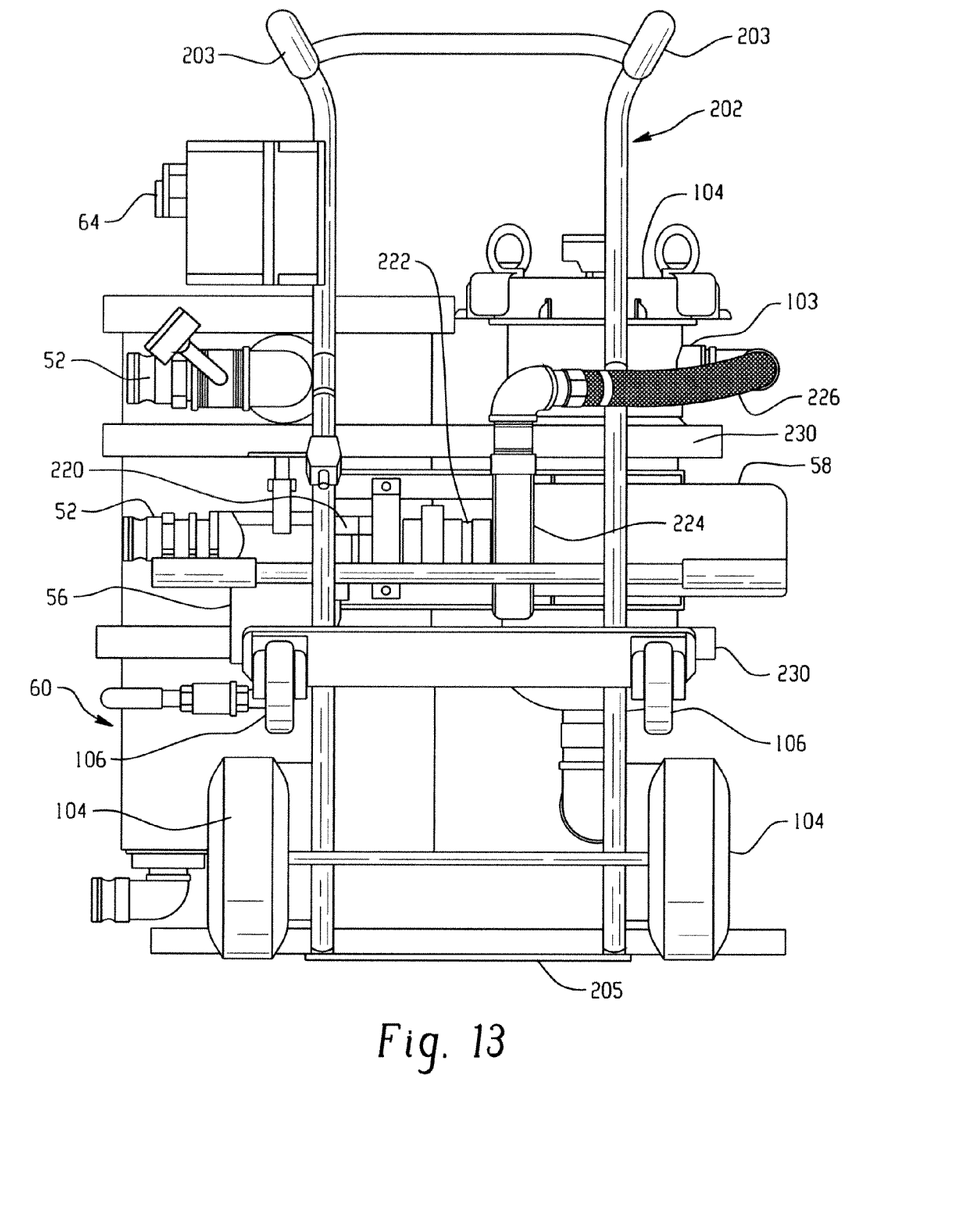
FIG. 13 is a rear view of the system of FIG. 8.

Referring to FIGS. 3, 4 and 7, the basket is surrounded by a bag filter 134 which has at its upper end an annular flange 136 attached thereto, as for example by ultrasonic weldment. The flange 136 has an outwardly and upwardly extending portion forming a lip 138 which is in contact with and urged downwardly by a flange 140 provided on a hold down spring 142 which has its upper end registered against and retained by the undersurface of lid 104. Referring again to FIGS. 3, 4 and 7, the bag filter 134 is surrounded by a second outer perforated basket 146 which is attached to an annular flange 148 having an outwardly extending portion 150 which contacts a resilient annular seal 152, such as an o-ring, for sealing against an annular rib 154 formed in the housing 100 (see FIG. 4). Thus, as shown in FIG. 4, basket flange 128 is retained against the flange 136 of the bag filter which is pressed against the flange 150 by contact of lip 138 with the hold down flange 140. This arrangement thus prevents fluids entering the housing inlet 103 from bypassing the particulate material in cartridge 124 thereby requiring the wastewater to flow through the material in the cartridge 124 and outwardly through the perforations 130 in the downstream or lower portion of the basket 122. The effluent of the basket perforations 130 then flows outwardly through the bag filter 134 then through the perforated outer basket 146 and through outlet 105 of the housing 100.

The outlet 105 is connected to the disconnect fitting 26 of the system 10 of FIG. 1; and, in the system 40 of FIG. 2, it is connected to the outlet disconnect fitting 62.

In the present practice, it has been found satisfactory to have the sleeve 124 woven of monofilament material having a diameter expandable in the range of about 38 to 89 mm and has a wall thickness of about 0.63 mm with the monofilament having a tensile strength per ASTM D-2265 of about 7.5 pounds and a specific gravity of about 1.38. However, other configurations of woven mesh and sizes may be employed to accommodate the desired amount of particulate polymer material to be employed. In the present practice, the basket 122 has a diameter of about 78 mm and has an overall length of about 318 mm and may be formed of corrosion resistant or stainless steel or other suitable material. It will be understood that the basket may be formed of different configurations and dimensions commensurate with the configuration of the housing 106 and the amount of particulate polymer material to be encased therein. In the present practice, the exemplary version described has been found satisfactory to employ a bag filter capable of filtering particles larger than 1 micron ($1 \times 10^{-6}$ meters); however, bag filters with different filtering capabilities may be employed.

Referring to FIGS. 8-13, the system 40 illustrated in FIG. 2 is shown in a portable version indicated generally at 200. The components are mounted on an upright cart indicated generally at 202 having a front set of wheels 204 and handles 203 on the upper end. A second auxiliary set of wheels 206 is provided for inclining the cart and a platform 205 is provided for supporting the drum. The system 200 includes reservoir 48 which comprises a drum which may have a removable lid 208 and which has inlet fitting 46 connected to valve 44 and quick disconnect fitting 42 for connection to a sprinkler system discharge connection. The outlet 50 of the reservoir is connected through quick disconnect fitting 62 to a swivel fitting 210 connected to a pipe 212 which is connected at its opposite end to a second swivel fitting 214 which connects to a quick disconnect 52 at the inlet of the strainer 56. The drum is held onto the cart by straps 228 anchored to channels 230 attached to the cart 202. Filter unit 60 is retained by straps 232 anchored to channels 230.

An electrical receptacle box 216 is mounted on a plate 218 provided on the cart; and, box 216 contains the manual switch 64 and the pilot light 66 along with an electrical lead 218 (see FIG. 11) for electrical connection thereto from a source of electrical power.

Strainer 56 has the outlet 220 thereof connected to the inlet 103 of the filtration unit 60. The outlet 105 of the filtration unit 60 is connected through quick disconnect coupling 62 to a drain such as a storm water drain (not shown). The present disclosure thus describes a filtration system having, in one version, a strainer for connection to a fire department connection for draining fire hydrants or other fluid systems requiring wastewater drain. The strainer outlet being connected to a pump which supplies strained fluid to the inlet of a filtration unit. The filtration unit includes a housing with a cavity having a basket with the downstream portion or lower portion perforated and having disposed therein a filter cartridge formed of a woven mesh sleeve filled with particulate polymer material for filtering. The basket is surrounded by a bag filter which further filters the effluent of the cartridge and which may be encased in an outer basket. The effluent of the bag filter is discharged through an outlet in the housing remote from the inlet. In a second version, the strainer has its inlet connected to receive fluid from a reservoir or tank. The version including the reservoir is described as mounted on a wheeled cart for portability and is particularly suitable for in situ draining of wastewater from fire suppression sprinkler systems.

The exemplary embodiments have been described with reference to the drawings. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A filter assembly for wastewater comprising:
   (a) a housing defining a filtering chamber having an opening for receiving filtering material, a lid operative for closing the opening, an inlet proximate the opening and an outlet distal the inlet;
   (b) a filter basket having an imperforate portion proximate the open end and a perforate portion downstream of the imperforate portion, the basket removably received in the chamber through the opening in the filtering chamber;
   (c) a filter cartridge comprising a flexible porous sleeve filled with particulate polymer material and closed at its ends thereof, the cartridge being disposed in the basket and extending into the imperforate portion and into the perforate portion;
   (d) a bag filter disposed about the basket and removable with the basket, wherein wastewater received through the inlet is caused to flow sequentially through the cartridge, outwardly through the perforate portion of the basket and through the bag filter to the outlet.

2. The filter assembly of claim 1, wherein the flexible porous sleeve includes a woven sleeve disposed about the particulate polymer material.

3. The filter assembly of claim 2, wherein the sleeve is formed of woven monofilament.

4. The filter assembly of claim 1, wherein the bag filter is capable of filtering particles of at least 1 micron ($1 \times 10^{-6}$ meters).

5. The filter assembly of claim 1, further comprising a spring clamp for retaining the basket and cartridge in the chamber downstream of the inlet.

6. The filter assembly of claim 1, further comprising a porous outer retainer basket surrounding the bag filter.

7. The filter assembly of claim 1, wherein the basket includes an annular flange with an annular seal for preventing wastewater entering the chamber from the inlet from bypassing the filter cartridge.

8. The filter assembly of claim 1, wherein the bag filter has an annular flange attached thereto and an annular seal sealing the flange on a sealing surface formed in the chamber.

9. The filter assembly of claim 1, further comprising an outer retain basket disposed over the bag filter having an annular flange sealed on an annular sealing surface in the chamber by an o-ring operative for preventing flow from the inlet from by-passing the filter cartridge.

10. The filter assembly of claim 1, wherein the sleeve is formed of woven mesh polymer material.

11. The filter assembly of claim 1, wherein the housing comprises a pressure vessel with an annular flange with a sealing groove about the opening; and, the lid is releasably secured and sealed thereon.

12. The filter assembly of claim 11, wherein the lid is releasably secured by swing bolts.

* * * * *